June 16, 1964 E. L. YOUNG 3,137,800
DYNAMOELECTRIC MACHINE ROTOR MEANS
Filed Dec. 19, 1960 3 Sheets-Sheet 3
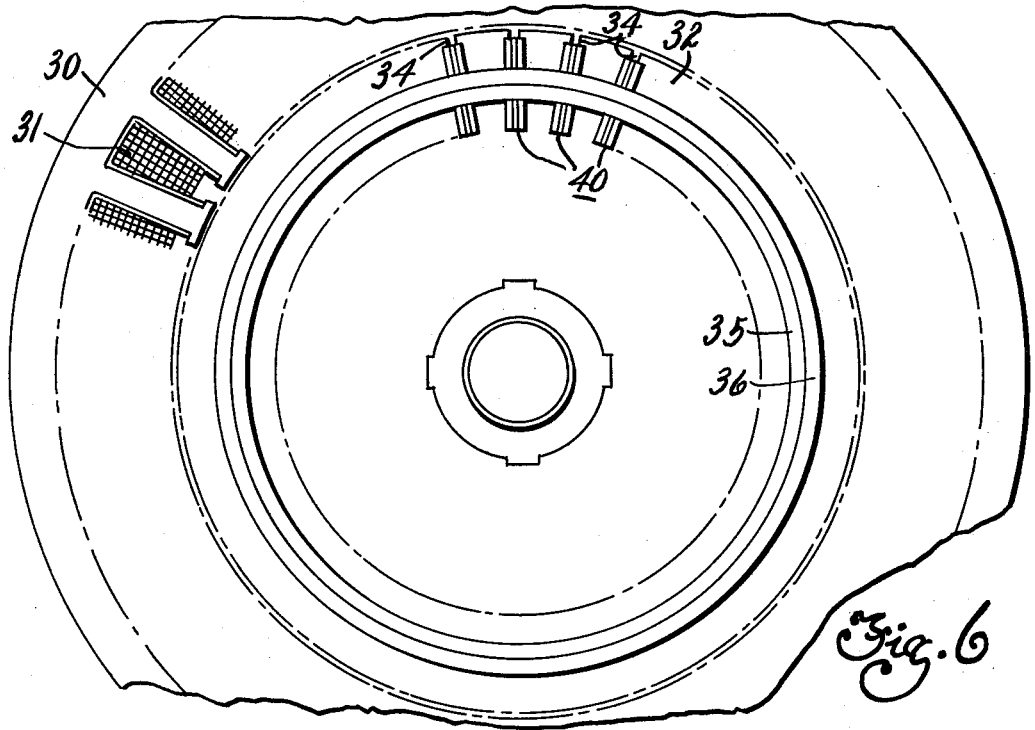
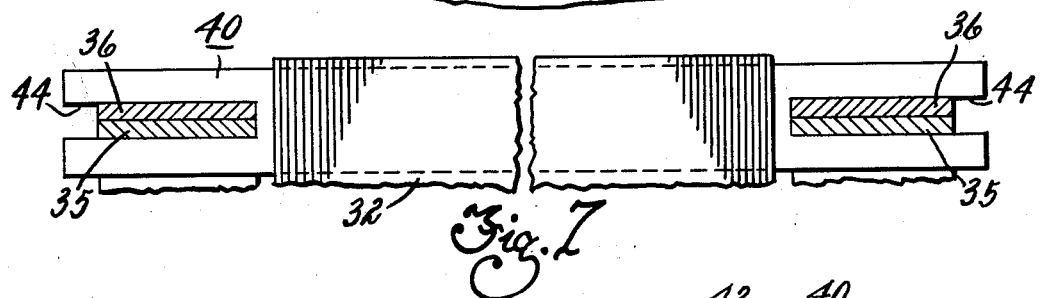
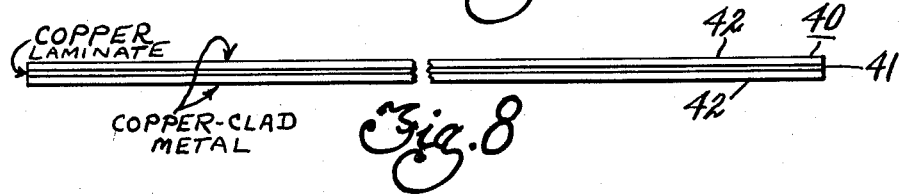
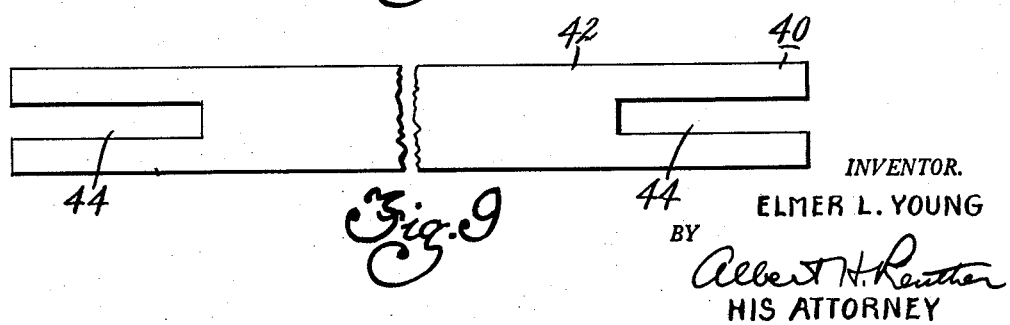
INVENTOR.
ELMER L. YOUNG
BY
Albert H. Reuther
HIS ATTORNEY

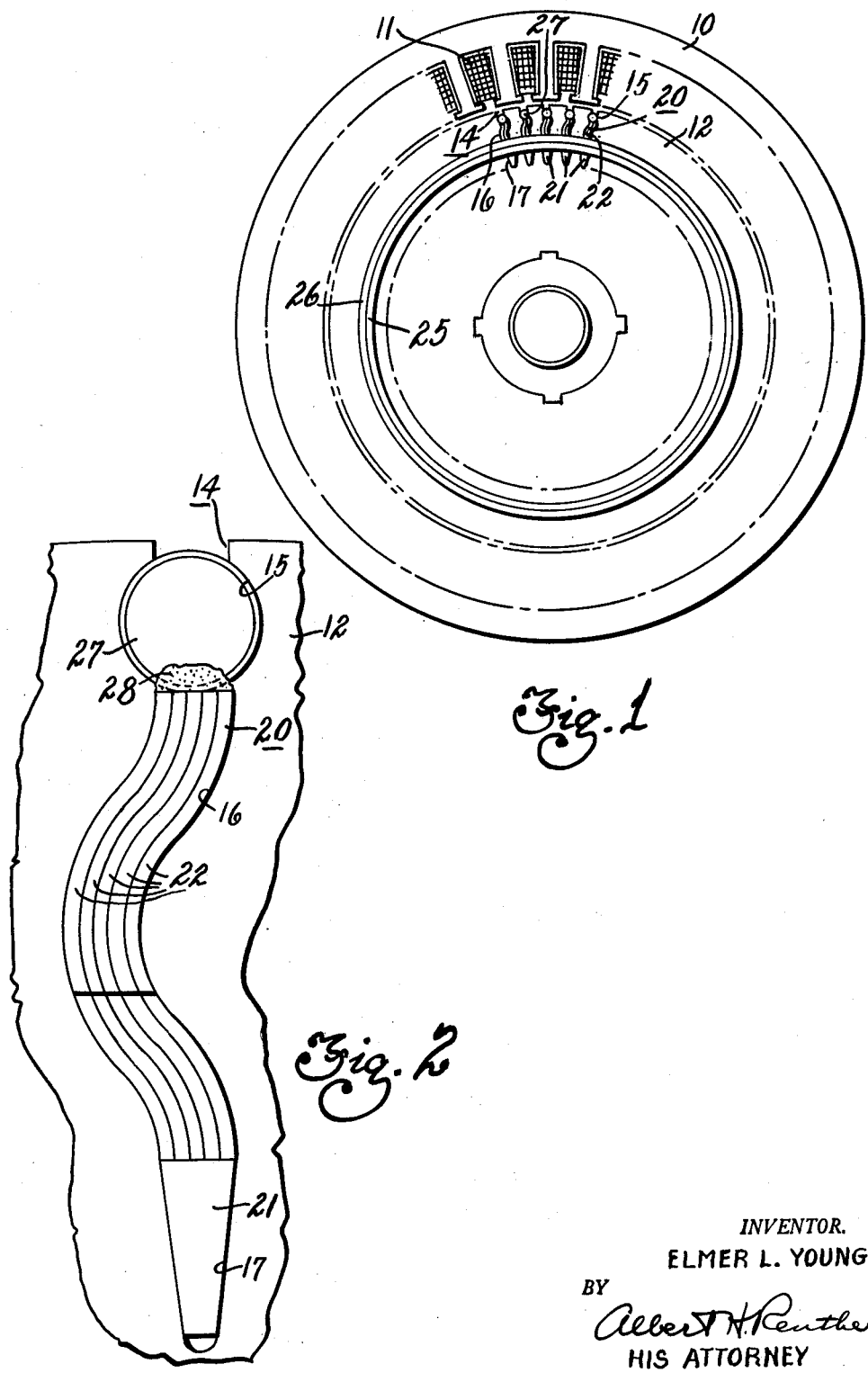

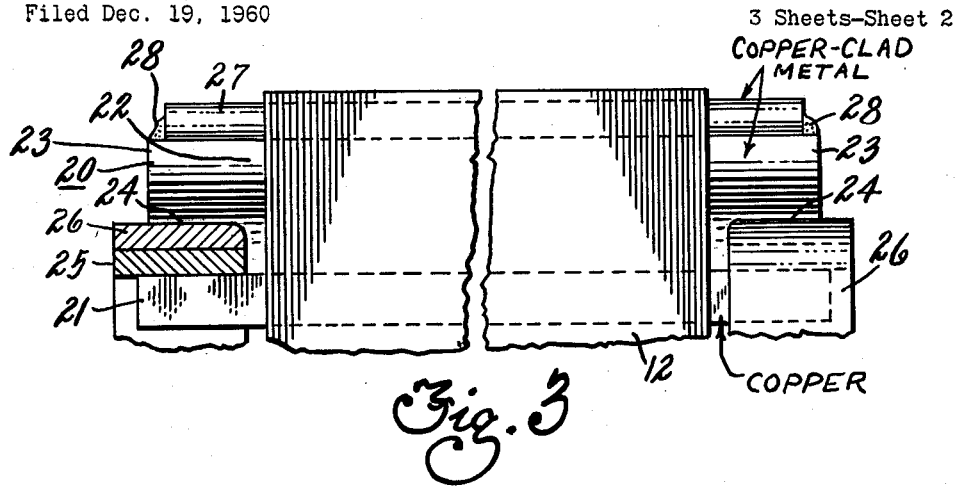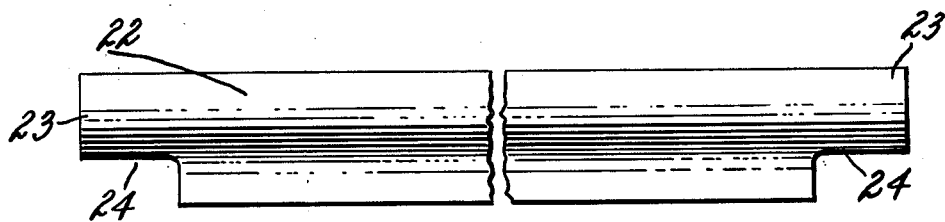

United States Patent Office 3,137,800
Patented June 16, 1964

3,137,800
DYNAMOELECTRIC MACHINE ROTOR MEANS
Elmer L. Young, Dayton, Ohio, assignor to General Motors Corporation, Detroit, Mich., a corporation of Delaware
Filed Dec. 19, 1960, Ser. No. 76,785
6 Claims. (Cl. 310—212)

This invention relates to a dynamoelectric machine, and particularly, to a multi-part rotor winding and slot structure for high speed operation.

An object of this invention is to provide a new and improved rotor winding means and slot structure for high speed operation of dynamoelectric machines.

Another object of this invention is to provide a multi-part rotor winding and slot structure curved at least in part for a dynamoelectric machine adapted for high speed operation.

Another object of this invention is to provide a slot structure and laminated-bar rotor winding at least part of which includes a steel conductor as well as copper in a dynamoelectric machine.

A further object of this invention is to provide a slot structure and rotor winding having a three-part conductor in each slot including an outer rod portion which is made of copper-clad steel, a central laminated portion of copper-plated steel and a radially inner rod of substantially pure copper all retained in an irregularly shaped slot configuration to complement radial positioning of the inner rod and remaining portions having opposite ends joined to ring means.

Another object of this invention is to provide in combination with a dynamoelectric machine rotor a laterally irregular slot configuration adapted to complement a multi-part rotor winding at least partially cutout at opposite ends to receive shorting ring means.

Another object of this invention is to provide a multi-part rotor winding and slot structure in which conductor bars include layers of differing metals such as steel and copper having ends slotted to fit in dovetail relation to annular shorting means secured thereto such as by brazing and the like.

Further objects and advantages of the present invention will be apparent from the following description, reference being had to the accompanying drawings wherein preferred embodiments of the present invention are clearly shown.

In the drawing:

FIGURE 1 is an end view of dynamoelectric machine components including stator and rotor means in accordance with the present invention.

FIGURE 2 is an enlarged end view of a rotor slot having conductor means in accordance with the present invention.

FIGURE 3 is a fragmentary and partially sectioned side view of rotor means in accordance with the present invention.

FIGURES 4 and 5 show end and side views, respectively, of a central portion of conductor means for the slots in a rotor component of FIGURES 1–3.

FIGURE 6 is an end view of further dynamoelectric machine components including stator and rotor means in accordance with the present invention.

FIGURE 7 is a partially sectioned side view of rotor means in accordance with the present invention.

FIGURES 8 and 9 show edge and side views, respectively, of conductor means for the slots in a rotor component of FIGURES 6 and 7.

Dynamoelectric machine components including a stator 10 with a winding 11 as well as rotor means 12 in accordance with the present invention can be seen in FIGURE 1. The rotor 12 can include a plurality of metal laminations slotted along an outer periphery thereof and mounted on a shaft suitably journalled for rotation in a well-known manner. Slots represented by numeral 14 and visible in FIGURES 1 and 2 have a configuration and laminated conductor means therein unique for so-called squirrel cage rotor components having shorting end rings on opposite sides thereof. As apparent in FIGURES 1 and 2, each of the slots 14 is provided with a substantially circular portion substantially adjacent to a radially outer end of each slot as well as an intermediate or central portion 16 and a radially inner end portion 17. The radially inner portion 17 is substantially wedge-like and slightly wider at a radially outer portion than adjacent to a radially inner portion thereof. The inner end portion 17 of each slot 14 is substantially in radial alignment with the outer circular portion 15 though the intermediate portion 16 is offset and wavy to have a bend, semi-circular or U-shaped configuration as represented in views of FIGURES 1 and 2.

FIGURES 1, 2, and 3 illustrate in combination with a dynamoelectric machine rotor a multi-part rotor winding generally indicated by numeral 20. Only in radially inner end portion 17 of slot 14 is there a substantially pure copper conductor bar 21 which can be wedge-like in cross section to complement opposite surfaces of the slot end portion 17. In the wavy central portion 16 of each slot 14 there can be laminated or sandwiched pieces 22 each made of a ferrous metal such as steel coated or clad with non-ferrous metal, for example, copper as well as alloys including nickel and chrome or Nichrome. FIGURE 4 provides an end view of a single piece 22 having a copper covering plated thereon in a thickness of at least .003 inch. Use of a plurality of such pieces 22 facilitates manufacture of conductor means for large dynamoelectric machine rotors and provides greater flexibility in assembly of conductor parts into a rotor. Since a plurality of pieces can be easier to work with and can be mass produced to have a predetermined configuration collectively complementary to at least a central portion 16 of each slot 14 it is possible to use differing metals in differing locations or predetermined positions in an irregularly-shaped slot such as 14.

As shown in FIGURES 4 and 5, each of the pieces 22 includes an axially or longitudinally extending tab or end portion 23 on each of opposite sides. Adjacent to each tab or end portion 23 thereis is a cutout or slot 24 into which end ring means including concentric annular portions 25 and 26 can be secured or attached by press fitting, soldering and the like in a location radially in-between opposite longitudinally extending ends of conductor bars 21 and tab or end portion 23 of central pieces 22. It is to be understood that the laminated pieces 22 can be joined to each other along opposite axial edges of end portions 23 by soldering and the like. Thus the annular end ring portions 25–26 can be electrically joined such as by soldering or brazing to the inner copper bar 21 as well as to a laminated subassembly of U-shaped pieces 22 fitted to an intermediate portion 16 of slots 14.

In each radially outer portion 15 of slots 14 there can be a substantially cylindrical or circular conductor bar portion 27 shown in FIGURES 1, 2, and 3. This circular bar or rod 27 has a ferrous metal core of steel and the like that is copper-clad or coated. Use of ferrous metal in the laminated pieces 22 and rod 27 permits reduction cost while simultaneously having copper covering thereon for enhanced electrical conductivity. Each circular rod 27 has opposite ends projecting outwardly from the rotor means 12 and a weld or brazing 28 indicated in FIGURE 3 can be provided at ends only in locations on top of end portions 23 of the pieces 22. To prevent internal gaps between the circular rod 27 and pieces 22 along radially outer edges thereof there can be a dip soldering of the rods as well as soldering or brazing of the ends. Irregular configuration of each of the slots 14 coupled with multi-part conductor means fitted therein particularly including the U-shaped pieces 22 assures positive interlock of conductor portions. The circular rod or bar 27 adjacent to an outer end of each slot further enhances maintenance of positioning of the multiple portions and pieces which collectively form conductor means located longitudinally relative to the rotor 12 and joined by end rings including annular shorting portions 25–26. It is to be understood that the shorting end rings can be formed as a single ring rather than as a concentric multi-part structure. Irregular configuration of the slots 14 in conjunction with wavy pieces 22 as well as inner and outer bars 21 and 27 can provide excellent support for rotor conductor means against centrifugal forces to permit very high speed operation. Depending upon requirements of a particular dynamoelectric machine, the number of intermediate pieces such as 22 can equal or can be a fraction of the number of remaining conductor bars such as 21 and 27. This fraction can be equal to or greater than unity. In views of FIGURES 1 and 2 it is apparent that a lamination or sandwich of five irregularly shaped pieces 22 can be used to fit into a central or intermediate portion 16 of each of the slots 14.

In some dynamoelectric machines having a stator 30 with stator windings 31 as well as a rotor 32 illustrated in FIGURE 6, there can be a multi-part conductor means in rotor slots 34 located along a radially outer periphery of the rotor component 32. The rotor component 32 is mounted on a shaft suitably journalled as to stator components in a well-known manner. A pair of concentric end ring portions 35 and 36 can be provided for electrically shorting conductor means generally indicated by numeral 40 at each of opposite ends of a rotor component such as 32. FIGURES 8 and 9 illustrate the conductor means 40 for each of the slots 34. Each multi-part conductor means 40 includes a central copper portion 41 as well as a pair of opposite copper-clad ferrous metal or steel portions 42. The copper portion 41 is sandwiched in-between the copper-plated steel portions 42 and thus a total of three parts is subassembled as conductor means 40 having cutouts or slots 44 adjacent to opposite ends into which the annular shorting ring means including inner and outer concentric portions 35–36 can be secured by press-fit, butt welding and the like at predetermined junctures between bifurcated ends laminated to each other to form the slots 44 as noted earlier. A dovetail fit of the annular ring portions 35–36 into the slots 44 assures retention of the conductor means 40 in slots 34 that can have a restricted opening along a radially outer epriphery of the rotor 32. The view of FIGURE 8 illustrates the three part sandwiching of steel and copper components or portions of the conductor means 40. Use of a laminated subassembly of copper-plated steel with an inner portion of substantially pure copper permits reduction in cost of conducting means for large dynamoelectric machines and enhances strength and rigidity of the conducting means in a manner similar to strengthening of wooden panels by use of plywood laminations and the like in a differing field of endeavor. Thickness of an inner copper portion 41 illustrated in FIGURE 8 can be in a range between .0015–.03 inch, preferably substantially .015 inch. The steel portions 42 have substantially the same dimensions with .015 inch copper plating or coating thereon. It is to be understood that portion 41 as well as the covering for portions 42 can be other non-ferrous materials including, for example, alloys of nickel and chrome in a thickness range depending upon size and characteristics desired.

While the embodiments of the present invention as herein disclosed constitute preferred forms, it is to be understood that other forms might be adopted.

What is claimed is as follows:

1. For a dynamoelectric machine having rotor means with radial slots curved at least in part, a multi-part winding comprising, a pair of conductor bars radially spaced from each other, substantially U-shaped portions sandwiched together to be complementary to the curved part of the slots and positioned intermediate said bars to have cut-out ends projecting therebetween, and end-shorting ring means attached to at least said cut-out ends and one of said bars on each of opposite sides of the rotor means.

2. The winding of claim 1 wherein said U-shaped portions total five and said ring means on each side includes a pair of annular concentric portions.

3. The winding of claim 1 wherein a radially inner one of said bars has a wedge-like cross section of substantially pure copper, said U-shaped portions and radially outer substantially cylindrical bar having a ferrous core which is copper clad.

4. For use in combination with a dynamoelectric machine having rotor means with radially located slots each having a wedge-like inner end portion, a curved intermediate portion and a substantially circular portion adjacent to an outer end thereof, a multi-part winding comprising a radially-inner wedge-like copper conductor fitted into the wedge-like inner end portion of each of the slots, a laminated subassembly of substantially U-shaped conductor means cut-out at opposite ends and fitted into the curved intermediate portion of each of the slots, a substantially cylindrical rod fitted into the circular portion of each of the slots, and shorting ring means attached to the cut-out end portions of said U-shaped conductor means which collectively are retained in the slots against high speed centrifugal force by co-operation of said rods and laminated U-shaped conductor means with the circular and curved portions respectively of the slots in the rotor means, and end-ring shorting means joined to opposite ends along said cut-out portions.

5. The winding of claim 4 wherein said rods and laminated conductor means are made of steel covered with a predetermined thickness of copper.

6. Rotor means for a dynamoelectric machine, comprising, a body portion having slots therein along an outer periphery thereof, a multi-part conductor means fed into the slots to have cut-out end portions projecting therefrom, and shorting end ring means carried by said cutout end portions in a location only radially inwardly along said multi-part conductor means, said slots being curved at least in part and said multi-part conductor means including longitudinally extending U-shaped portions sandwiched together to be complementary to the curved part of the slots.

References Cited in the file of this patent

UNITED STATES PATENTS

| 1,240,018 | Bergman | Sept. 11, 1917 |
| 2,846,601 | Jacobs | Aug. 5, 1958 |